(12) United States Patent
Luo et al.

(10) Patent No.: US 9,326,291 B2
(45) Date of Patent: Apr. 26, 2016

(54) METHOD AND APPARATUS FOR DYNAMIC SPECTRUM MANAGEMENT

(71) Applicant: Huawei Technologies Co., Ltd., Shenzhen (CN)

(72) Inventors: Zezhou Luo, Shenzhen (CN); Hongcheng Zhuang, Shenzhen (CN); Jietao Zhang, Shenzhen (CN); Jianqiang Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 14/224,734

(22) Filed: Mar. 25, 2014

(65) Prior Publication Data

US 2014/0206374 A1    Jul. 24, 2014

Related U.S. Application Data

(63) Continuation of application No. PCT/CN2012/082207, filed on Sep. 27, 2012.

(30) Foreign Application Priority Data

Sep. 27, 2011 (CN) .......................... 2011 1 0299952

(51) Int. Cl.
*H04W 72/04* (2009.01)
*H04W 16/10* (2009.01)
*H04W 72/08* (2009.01)

(52) U.S. Cl.
CPC .......... *H04W 72/0486* (2013.01); *H04W 16/10* (2013.01); *H04W 72/082* (2013.01)

(58) Field of Classification Search
CPC .... H04W 16/14; H04W 72/082; H04W 16/10
See application file for complete search history.

(56) References Cited

U.S. PATENT DOCUMENTS 6,314,294 B1 * 11/2001 Benveniste ................ 455/452.2
2008/0076440 A1    3/2008 Guo et al.
(Continued)

FOREIGN PATENT DOCUMENTS

CN    101146343 A    3/2008
CN    101873651 A    10/2010
(Continued)

OTHER PUBLICATIONS

Srinivasan et al., "IEEE 802.16m System Description Document (SDD)" IEEE 802.16m-09/0034r4, Dec. 21, 2010, 170 pages.
(Continued)

*Primary Examiner* — Ernest Tacsik
(74) *Attorney, Agent, or Firm* — Brinks Gilson & Lione

(57) ABSTRACT

Embodiments of the present invention provide a method and an apparatus for dynamic spectrum management. The method includes: determining a reusable spectrum for one of multiple cell links in a network according to co-frequency indication information, where the co-frequency indication information is used to indicate reusable levels of spectrums of other cell links for each cell link in the multiple cell links; and updating a spectrum configuration of the one of the multiple cell links by using the reusable spectrum of the one of the multiple cell links. By determining a reusable spectrum for a specific cell link according to co-frequency indication information, embodiments of the present invention can locally adjust the spectrum configuration of the specific cell link, thereby reducing a spectrum configuration overhead while increasing network capacity and reducing inter-cell interference.

23 Claims, 8 Drawing Sheets

(56) References Cited

U.S. PATENT DOCUMENTS

| | | | |
|---|---|---|---|
| 2009/0191888 A1* | 7/2009 | Abedi | 455/450 |
| 2009/0191889 A1* | 7/2009 | Abedi | 455/452.1 |
| 2010/0173586 A1* | 7/2010 | McHenry et al. | 455/62 |
| 2010/0214939 A1* | 8/2010 | Ryan | 370/252 |
| 2010/0303026 A1* | 12/2010 | Chaudhri et al. | 370/329 |
| 2014/0016599 A1 | 1/2014 | Kawamura et al. | |

FOREIGN PATENT DOCUMENTS

| | | |
|---|---|---|
| CN | 102124801 A | 7/2011 |
| CN | 102625365 A | 8/2012 |
| WO | WO 2012/054898 A2 | 4/2012 |

OTHER PUBLICATIONS

Lte, "3$^{rd}$ Generation Partnership Project; Technical Specification Group Radio Access Network; Evolved Universal Terrestrial Radio Access (E-UTRA); Further advancements for E-UTRA physical layer aspects" (Release 9) 3GPP TR 36.814, V9.0.0, Mar. 2010, 104 pages.

López-Pérez et al., "Dynamic Frequency Planning Versus Frequency Reuse Schemes in OFDMA Networks" IEEE 2009, 5 pages.

* cited by examiner

METHOD AND APPARATUS FOR DYNAMIC SPECTRUM MANAGEMENT

CROSS-REFERENCE TO RELATED APPLICATIONS

This application is a continuation of International Application No. PCT/CN2012/082207, filed on Sep. 27, 2012, which claims priority to Chinese Patent Application No. 201110299952.4, filed on Sep. 27, 2011, both of which are hereby incorporated by reference in their entireties.

TECHNICAL FIELD

Embodiments of the present invention relate to the field of communications technologies, and in particular, to a method and an apparatus for dynamic spectrum management.

BACKGROUND

With the continuous expansion of a mobile communications network and miniaturization of base stations, the number of network elements that an operator needs to maintain increases sharply, and higher maintenance cost is required. Therefore, a self-organizing network (SON, self-organizing network) is proposed, and automation is implemented as far as possible in the phases of planning, deployment, and operation and maintenance on the mobile communications network to save the operation cost.

As requirements for mobile communications increase sharply, available spectrum resources are relatively insufficient. Therefore, it is more and more important to flexibly allocate a spectrum to improve network capacity and spectrum efficiency. In addition, a change of the operating environment (for example, increase of cell traffic and uneven load distribution) causes a mismatch between spectrum allocation and load distribution and causes decrease of network performance.

Spectrum allocation, as a planning problem, is usually based on a long-timescale network environment, for example, a site location, average bandwidth capacity, spectrum efficiency, and large-scale signal attenuation. The conventional static spectrum allocation remains unchanged within a long period after planning and optimization are completed in the early phase of network construction, and spectrum replanning is not required until obvious decrease of network performance or until network reconstruction.

The conventional dynamic spectrum allocation aims at minimizing the overall interference strength within a network, and dynamic spectrum allocation is performed according to the actual measured and collected interference strength in the network operation period. For example, dynamic spectrum management (DSM, Dynamic Spectrum Management) dynamically manages and allocates spectrums according to the current operating environment of the network, and can improve the level of matching between spectrum resources and load distribution, thereby improving network performance.

However, the conventional spectrum allocation affects all cells in the network and causes unnecessary overheads.

SUMMARY

Embodiments of the present invention provide a method and an apparatus for dynamic spectrum management, and can locally adjust the spectrum configuration of a specific cell link, thereby reducing a spectrum configuration overhead.

In one aspect, an embodiment of the present invention provides a method for dynamic spectrum management, including: determining a reusable spectrum for one of multiple cell links in a network according to co-frequency indication information, where the co-frequency indication information is used to indicate reusable levels of spectrums of other cell links for each cell link in the multiple cell links; and updating a spectrum configuration of the one of the multiple cell links by using the reusable spectrum of the one of the multiple cell links.

In another aspect, an embodiment of the present invention provides a method for dynamic spectrum management, including: estimating a load of a cell link having multiple spectrums after one of the multiple spectrums is released; and releasing the one of the multiple spectrums if the load of the cell link after the one of the multiple spectrums is released is lower than a third threshold.

In another aspect, an embodiment of the present invention provides an apparatus for dynamic spectrum management, including: a determining module, configured to determine a reusable spectrum for one of multiple cell links in a network according to co-frequency indication information, where the co-frequency indication information is used to indicate reusable levels of spectrums of other cell links for each cell link in the multiple cell links; and an updating module, configured to update a spectrum configuration of the one of the multiple cell links by using the reusable spectrum of the one of the multiple cell links.

In another aspect, an embodiment of the present invention provides an apparatus for dynamic spectrum management, further including: an estimating module, configured to estimate a load of one of multiple cell links having multiple spectrums after one of the multiple spectrums is released; and a releasing module, configured to release the one of the multiple spectrums if the load of the one of the multiple cell links after the one of the multiple spectrums is released is lower than a third threshold.

By determining a reusable spectrum for a specific cell link according to co-frequency indication information, embodiments of the present invention can locally adjust the spectrum configuration of the specific cell link, thereby reducing a spectrum configuration overhead while increasing network capacity and reducing inter-cell interference.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
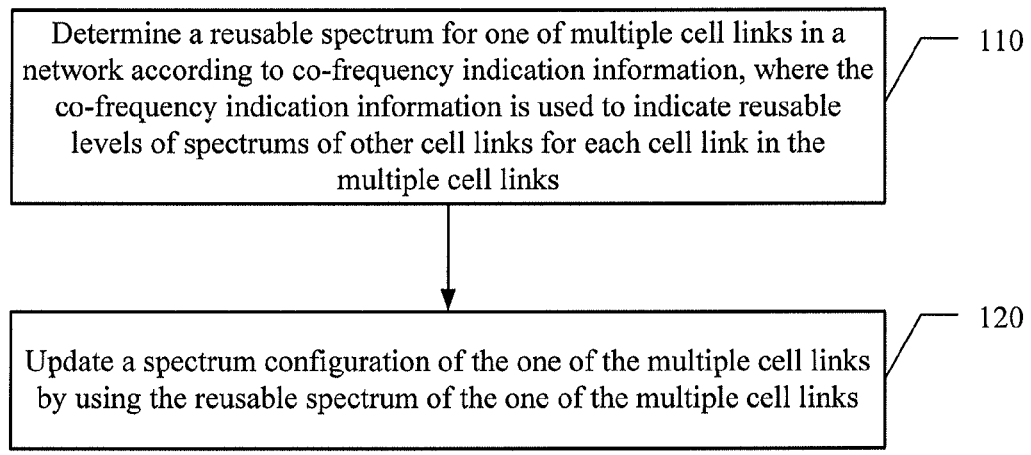
FIG. 1 is a schematic flowchart of a method for dynamic spectrum management according to an embodiment of the present invention.

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, for example, a global system for mobile communications (GSM, Global System for Mobile communication) system, a code division multiple access (CDMA, Code Division Multiple Access) system, a wideband code division multiple access (WCDMA, Wideband Code Division Multiple Access) system, a general packet radio service (GPRS, General Packet Radio Service), a long term evolution (LTE, Long Term Evolution) system, an advanced long term evolution (LTE-A, Advanced long term evolution) system, and a universal mobile telecommunications system (UMTS, Universal Mobile Telecommunication System). Embodiments of the present invention use an LTE network and/or an LTA-A network as an example for description, but are not limited in this regard.

It should also be understood that in the embodiments of the present invention, a terminal may also be referred to as a user equipment (UE, User Equipment), a mobile station (MS, Mobile Station), a mobile terminal (Mobile Terminal), and so on. The terminal may communicate with one or more core networks through a radio access network (RAN, Radio Access Network). For example, the terminal may be a mobile phone (or referred to as a "cellular" phone), or a computer equipped with a mobile terminal. For example, the terminal may also be a portable computer, a pocket computer, a handheld computer, or a computer built-in or vehicle mounted mobile apparatus.

It should also be understood that in the embodiments of the present invention, a base station may be a base transceiver station (BTS, Base Transceiver Station) in a GSM, or a NodeB (NB, NodeB) in a WCDMA, or an evolved NodeB (eNB or eNodeB, Evolved NodeB) in an LTE. In addition, the base station may be a small-sized base station (for example, a micro base station) in a heterogeneous network, a relay station (relay) in an LTE relay network, or an access point (AP, Access Point), and embodiments of the present invention are not limited in this regard.

With the operation of the network, the number of users and traffic may change greatly, thereby causing imbalance of the load of each cell link. The cell link of a heavy load may cause great interference to nearby co-frequency cell links, thereby reducing spectrum efficiency of interfered cell links. Optimization of spectrum configurations is performed based on long-term network measurement features, and is different from optimization of resource management levels based on short-term measurement. The change time of the network status is usually longer than the scheduling interval and shorter than the time interval of the conventional manual adjustment. Therefore, neither scheduling algorithm optimization nor manual optimization can well adapt to the change of the network status. The problem caused by improper spectrum configurations mainly lies in: network load imbalance, overload of pico cells, and great inter-cell interference, thereby causing low spectrum efficiency.

In an LTE relay network, a UE may access a base station through a relay station (relay) by two hops, and access the network through the base station, while the relay station is controlled by the donor eNB to some extent. In addition, in a relay network, a user terminal may directly access the network through the base station. Therefore, three links may exist: a direct link, a backhaul link, and an access link. In the embodiments of the present invention, if the three links use a same spectrum, it is called an in-band relay mode; otherwise, it is called an out-of-band relay mode. Particularly, in spectrum management of the relay network, spectrums of both the base station and its relay station need to be managed, and different features of the base station and its relay station need to be considered.

It should be noted that the spectrum mentioned in the embodiments of the present invention may refer to a frequency spectrum range which can be used by a cell, a base station, or the corresponding link, and may belong to a same carrier or different carriers. Because a cell usually corresponds to a link, for a non-relay network, the spectrum of the cell ink is also referred to as a spectrum of a cell.

FIG. 1 is a schematic flowchart of a method for dynamic spectrum management according to an embodiment of the present invention.

110. Determine a reusable spectrum for one of multiple cell links in a network according to co-frequency indication information, where the co-frequency indication information is used to indicate reusable levels of spectrums of other cell links for each cell link in the multiple cell links.

For example, when part of the network is congested or overloaded, the reuse mode of spectrums may be adjusted, and capacity of the cell link is increased by replacing the spectrum of the congested cell or adding a spectrum. The spectrum used for replacement or addition is being used by other cell links, and this is called spectrum reuse. According to the embodiment of the present invention, higher capacity may be obtained for the cell link by selecting and reusing spectrums of other cells, and the spectrum of the highest reusable level may be selected for reuse to minimize the impact on other cell links. The reusable level of the spectrum of another cell link for one cell link may indicate the level of an impact caused by the reusable spectrum on a key performance indicator (KPI, Key Performance Indicator) of the other cell link; for example, if the reusable spectrum causes the load change of the other cell link to exceed a preset threshold, it indicates that the reusable level is low; otherwise, it indicates that the reusable level is high. The embodiment of the present invention is not limited in this regard; for example, the above preset threshold may also be determined in combination with a certain operator policy. In addition, the key performance indicator of the cell link is also not limited to the load; for example, the KPI may also be cell interference and spectrum efficiency, and so on.

According to the embodiment of the present invention, to adapt to the network change, the network status may be monitored continuously, and the local spectrum configuration is adjusted or changed if the key performance indicator (for example, the load) exceeds the preset threshold, thereby providing an automatic network optimization function. The embodiment of the present invention is not limited in this regard; for example, the above process of dynamic spectrum management may be manually or periodically triggered.

120. Update a spectrum configuration of the one of the multiple cell links by using the reusable spectrum of the one of the multiple cell links. For example, for a cell link, updating a spectrum configuration includes the process of updating or adjusting the spectrum configuration such as replacing the original spectrum, releasing part of spectrums or adding a new spectrum. Replacing a spectrum refers to selecting another spectrum for replacing the original spectrum of the cell link, and adding a spectrum refers to adding a spectrum on the basis of the original spectrum of the cell link.

By determining a reusable spectrum for a specific cell link according to co-frequency indication information, the embodiment of the present invention can locally adjust the spectrum configuration of the specific cell link, thereby reducing a spectrum configuration overhead while increasing network capacity and reducing inter-cell interference.

According to another embodiment of the present invention, the method in FIG. 1 further includes: determining whether a load of the one of the multiple cell links exceeds a first threshold, where in step 110, the reusable spectrum for the one of the multiple cell links is determined according to the co-frequency indication information if the load of the one of the multiple cell links exceeds the first threshold. For example, a first threshold may be set for each cell, and is used to indicate that the load of the cell ink is heavy and that the spectrum needs to be reconfigured.

According to another embodiment of the present invention, the method in FIG. 1 further includes: determining whether interference strength of the one of the multiple cell links exceeds a second threshold, where in step 120, a spectrum of the one of the multiple cell links is replaced by using the reusable spectrum of the one of the multiple cell links if the interference strength of the one of the multiple cell links exceeds the second threshold; and the reusable spectrum of the one of the multiple cell links is added for the one of the multiple cell links if the interference strength of the one of the multiple cell links does not exceed the second threshold. For example, the load of part of the network is heavy, which may be caused by heavy traffic, or caused by great co-frequency interference to part of the network, while spectrum efficiency of part of the network is low, which is usually caused by co-frequency interference. The embodiment of the present invention can improve network performance by reconfiguring the local spectrum; if the interference strength of the cell link exceeds the preset threshold, or if the spectrum efficiency of the cell link is lower than the preset threshold, it indicates that the interference strength in the network on the original spectrum is great. In this case, it is appropriate to replace the original spectrum. In another aspect, if the interference strength of the cell link does not exceed the preset threshold, or if the spectrum efficiency of the cell link is not lower than the preset threshold, it indicates that the original spectrum is fully used but still cannot satisfy the traffic, and therefore a spectrum needs to be added.

According to another embodiment of the present invention, the method further includes: before determining the reusable spectrum for the one of the multiple cell links according to the co-frequency indication information, determining whether a new spectrum is available to the one of the multiple cell links; and if a new spectrum is available to the one of the multiple cell links, updating the spectrum configuration of the one of the multiple cell links by using the new spectrum, where in step 110, if no new spectrum is available to the one of the multiple cell links, the reusable spectrum for the one of the multiple cell links is determined according to the co-frequency indication information. For example, one solution to the heavy load is adding a new spectrum, where the so-called new spectrum is a spectrum not used by any cell link. Using a new spectrum not only can improve the load of a pico cell link, but also does not cause extra interference to other cell links. Therefore, the embodiment of the present invention can first determine whether a new spectrum is available before determining the reusable spectrum, and if there is a new available spectrum, first use the new spectrum.

According to another embodiment of the present invention, the method in FIG. 1 further includes: if the one of the multiple cell links has multiple spectrums, estimating a load of the one of the multiple cell links after one of the multiple spectrums is released; and releasing the one of the multiple spectrums if the load of the one of the multiple cell links after the one of the multiple spectrums is released is lower than a third threshold. For example, the embodiment of the present invention can release part of spectrums of the cell link having multiple spectrums for use by other cell links of heavy load, and after the spectrums are released, the load of the cell link does not exceed the preset threshold. For example, if the load of the cell link is lower than the third threshold, it may indicate that the load of the cell link after the spectrum is released is still at a bearable level.

According to another embodiment of the present invention, the method further includes: determining whether the load of the one of the multiple cell links is lower than a fourth threshold; where if the load of the one of the multiple cell links is lower than the fourth threshold, the load of the one of the multiple cell links after the one of the multiple spectrums is released is estimated. For example, when the load of the one of the multiple cell links is lower than a threshold, it indicates that the cell link has redundant spectrums. The process of releasing a spectrum may be triggered in order to improve the utilization of resources of the whole network without causing interference to the cell link. The embodiment of the present invention is not limited in this regard; for example, the above process of releasing a spectrum may be manually or periodically triggered.

According to another embodiment of the present invention, in the process of releasing one of the multiple spectrums, if the multiple spectrums have different bandwidth and the load of the one of the multiple cell links after a spectrum of the lowest bandwidth is released is lower than the third threshold, the spectrum of the lowest bandwidth is released; or if the multiple spectrums have a same bandwidth and the load of the one of the multiple cell links after a spectrum of the lowest load is released is lower than the third threshold, the spectrum of the lowest load is released. According to the embodiment of the present invention, first releasing the spectrum of the lowest bandwidth may cause the load change of the cell link to be more smooth, while first releasing the spectrum of the lowest load may reduce the impact on the service of the cell link.

According to the embodiment of the present invention, the co-frequency indication information includes a co-frequency indication matrix, and the method further includes: obtaining a link state of each cell link in the multiple cell links, propagation attenuation parameters, and a topology of the network; and generating or updating the co-frequency indication matrix according to the link state of each cell link in the multiple cell links, the propagation attenuation parameters, and the topology of the network, where each element of the co-frequency indication matrix indicates a reusable level of a spectrum of another cell link for one cell link in the multiple cell links. For example, an element of the co-frequency indication matrix may be a level (for example, high, medium, and low) of a difference (a load change) between the estimated load after the spectrum of the cell link corresponding to the element is reused by another cell and the actual load before the reuse. For example, if the load change of a cell link is greater than a preset threshold, it indicates that the reusable level is low, while if the load change of the cell link is smaller than another preset threshold, it indicates that the reusable level is high, and if the load change of the cell link is between the two preset thresholds, it indicates that the reusable level is medium. In the network operation process, the update or maintenance of the co-frequency indication matrix may be triggered periodically or through a trigger event. The trigger event generally includes: node insertion/deletion, change of the propagation environment, or manual trigger, and so on.

According to the embodiment of the present invention, the link state includes: the load of the cell link, interference strength, and transmit power of a base station of the cell link; the reusable level of the spectrum of the other cell link for the one cell link in the multiple cell links includes: a level of a load change before and after the spectrum of the spectrum of the other cell link is reused by the one cell link, where in step 110, a spectrum of a cell link at the highest level of the load change before and after the spectrum is reused by one of the multiple cell links is determined as the reusable spectrum for the one of the multiple cell links. The level of the load change may be determined according to an operator policy; for example, according to a requirement, it may be specified that a load change of a cell is at the highest level if the load change is greater than a preset threshold, and that a load change of another cell is at the highest level if the load change is greater than another preset threshold. Alternatively, when reusable levels of spectrums of two links for one link are the same, selection may be made according to a certain operator policy; for example, the spectrum of the cell link of the minimum co-frequency interference is selected.

According to the embodiment of the present invention, the load after the spectrum of the spectrum of the other cell link is reused by the one cell link is indicated by the following formula:

$$\overline{L}'_j \cong \left( \frac{1}{\overline{L}_j} - \frac{1}{\overline{T}_j} \cdot BW_{tot} \cdot \log\left( \frac{\overline{I}_j \times BW_{tot} + \hat{I}_{ij}}{\overline{I}_j \times BW_{tot}} \right) \right)^{-1}$$

where the one cell link is cell link i, the other cell link is cell link j, $\overline{L}_j$ indicates the load before the spectrum of cell link j is reused by cell link i, $BW_{tot}$ is a total bandwidth owned by cell link j, $\overline{I}_j$ is interference strength of the spectrum of cell link j, $\hat{I}_{ij}$ indicates/is i strength of co-frequency interference caused by cell link i to cell link j if cell link i reuses the spectrum of cell link j, $\hat{I}_{ij}$ is obtained according to transmit power of a base station of cell i link i and propagation attenuation parameters, and $\overline{T}_j$ indicates average throughput of cell link j.

Though the embodiment of the present invention uses the load formula, the present invention is not limited in this regard. Other formulas for calculating the estimated load may also be used; for example, more parameters may be considered to improve precision of estimation or fewer parameters may be considered to increase the speed of estimation.

According to the embodiment of the present invention, the one of the multiple cell links includes one of a direct link, a backhaul link, and an access link having a same spectrum in one of the multiple cells, where in step 110, the co-frequency indication matrix is searched for a reusable spectrum simultaneously suitable for the direct link, the backhaul link, and the access link according to the reusable levels of the spectrums of the other cell links in the multiple cell links for the one of the direct link, the backhaul link, and the access link; and if no reusable spectrum simultaneously suitable for the direct link, the backhaul link, and the access link is found, the co-frequency indication matrix is searched for a reusable spectrum respectively suitable for the direct link, the backhaul link, and the access link according to the reusable levels of the spectrums of the other cell links in the multiple cell links for the one of the direct link, the backhaul link, and the access link. For example, if considered from the perspective of network overheads, an in-band relay should keep the original mode as far as possible. Therefore, when the three link spectrum configurations are updated, the reusable spectrum simultaneously suitable for the three links may be first determined. If there is no reusable spectrum simultaneously suitable for the three links, a reusable spectrum is determined respectively for the three links, and the mode is switched to an out-of-band relay mode. According to the embodiment of the present invention, the reusable spectrum simultaneously suitable for the three links refers to a spectrum that may be reused by the three links.

According to the embodiment of the present invention, the one of the multiple cell links includes one of the direct link, the backhaul link, and the access link having different spectrums in one of the multiple cells, where in step 110, the co-frequency indication matrix is searched for a reusable spectrum respectively suitable for the direct link, the backhaul link, and the access link according to the reusable levels of the spectrums of the other cell links in the multiple cell links for the direct link, the backhaul link, and the access link, and the reusable spectrum is used as the reusable spectrum for the direct link, the backhaul link, and the access link. According to the embodiment of the present invention, in out-of-band mode, during updating of the spectrum configuration, the reusable spectrums for the three links may be determined respectively.

According to the embodiment of the present invention, in step 110, the co-frequency indication matrix is searched for a reusable spectrum for the one of the multiple cell links according to the reusable levels of the spectrums of the other cell links in the network for the one of the multiple cell links. For example, the column element (corresponding to each cell link) where the cell link is located may be traversed in the co-frequency indication matrix, so as to search for reusable spectrums that can be reused by the cell link and select the spectrum of the highest reusable level as the reusable spectrum for the cell link.

According to another embodiment of the present invention, the method in FIG. 1 further includes: counting the number of times of failing to find a reusable spectrum for at least one of the multiple cell links; and when the number of times exceeds a fifth threshold, indicating replanning of spectrums of the network. For example, if the number of times of failing to find a reusable spectrum for some cell links exceeds a preset threshold, it usually indicates that there are many cells of heavy load in the network, or indicates that the spectrum configuration of each cell in a specific area and traffic distribution are mismatched. The embodiment of the present invention may indicate replanning of spectrums of all cells in the specific area.

It should be noted that the method in FIG. 1 may be executed by a functional entity for centralized spectrum management in the network. The embodiment of the present invention is not limited in this regard; for example, the method in FIG. 1 may be executed by a functional entity for spectrum management and a base station in the network.

The following uses a cell link as a unit to describe a process of dynamic spectrum management according to an embodiment of the present invention.

Figure 2:
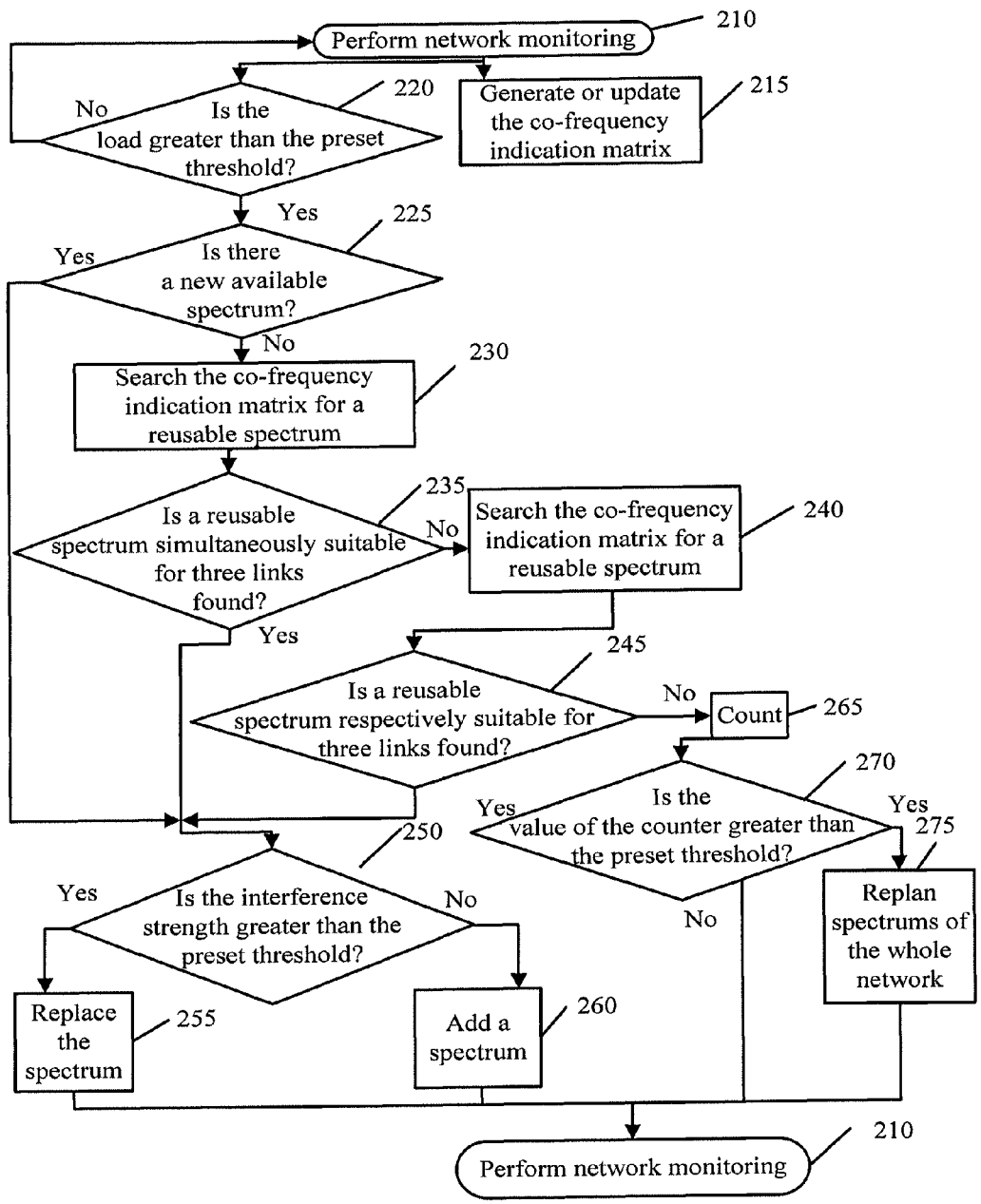
FIG. 2 is a schematic flowchart of an example of a process of dynamic spectrum management according to an embodiment of the present invention.

FIG. 2 is a schematic flowchart of a process of dynamic spectrum management according to an embodiment of the present invention. The process of dynamic spectrum management in FIG. 2 is applicable to the in-band relay mode.

210. Perform network monitoring to obtain KPI parameters.

The embodiment of the present invention may monitor the operational status of the network; that is, they measure air interface parameters, and measure and collect statistics of network transmission parameters and quality of service related parameters, where the monitoring result is stored in a database in the form of network parameters and KPIs. According to the embodiment of the present invention, the load, interference, and spectrum efficiency of the cell link are the main KPIs, and are parameters that may be directly measured by the network side and are also the basis for deciding spectrum allocation. For example, the load and spectrum efficiency of the cell link may be calculated by measuring the throughput and bandwidth allocation of the cell link. The interference strength of each frequency band in the cell may be obtained through the measurement and feedback of the base station and UE. According to the embodiment of the present invention, the function of dynamic spectrum management may be triggered when one of the three KPIs reaches the preset threshold.

For example, the KPI (for example, the air interface load) related to the load of the cell link may be defined as follows:

$$\bar{L} = \frac{\sum_t BW_t}{BW_{tot} \times T}. \tag{1}$$

where $BW_t$ is bandwidth occupied by the cell link at time t, $BW_{tot}$ is the total bandwidth owned by the cell link, and T is the measurement period (for example, an hour). For example, in an orthogonal frequency-division multiplexing system, the occupied bandwidth is equal to the number of subcarriers or the number of physical resource blocks (PRBs, Physical Resource Blocks).

The KPI related to interference of the cell link, for example, interference strength, may be defined as follows:

$$\bar{I} = \frac{\sum_t P_t}{BW_{tot} \times T}. \tag{2}$$

where $P_t$ is in-band interference power estimated at time t; for example, uplink and downlink interference may be included in a full duplex system. For example, the network side may control the UE to measure the carrier-to-noise ratio in part of spectrums, so as to obtain interference distribution in the whole spectrum, including in-band interference power.

215. Generate or update the co-frequency indication matrix.

According to the embodiment of the present invention, a co-frequency indication matrix is defined to provide an indication for updating a spectrum configuration. The co-frequency indication matrix indicates an assessment result of reusing a spectrum between any two cell links, that is, the reusable level of the spectrum between any two cell links. The co-frequency indication matrix indicates the impact caused to the cell if any cell link uses the spectrum being used by other cell links, and selection of the reusable spectrum may be implemented based on the co-frequency indication matrix.

According to the embodiment of the present invention, the co-frequency indication matrix may be generated based on the state (power, load, interference, and so on) of the cell link, propagation attenuation, network topology, and/or operator policy. Propagation environment parameters, namely, large-scale propagation attenuation parameters, may be obtained through measurement before network construction. After selection of a site location in the network planning phase, the location information (network topology) of the site may be obtained. The process of calculating the load and interference has been described above and is not further described herein.

Figure 3A:
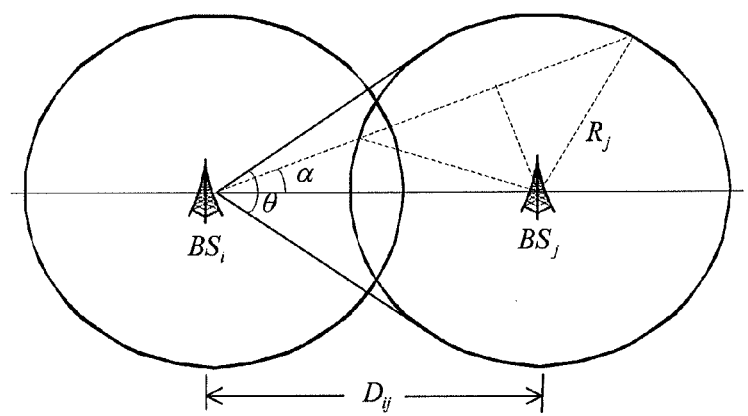
FIG. 3a to FIG. 3c are schematic diagrams of estimating co-frequency interference according to an embodiment of the present invention.
Figure 3B:
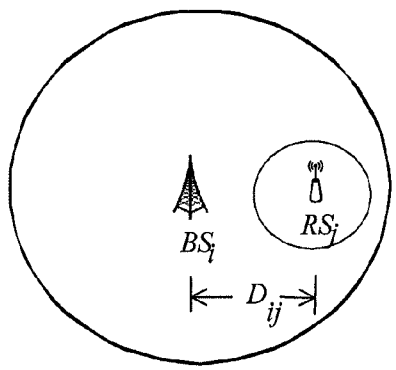
Figure 3C:
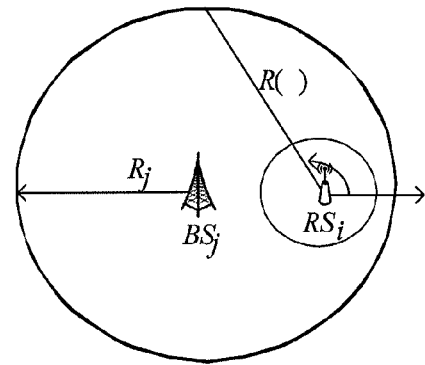

The following uses an example to describe the process of estimating a co-frequency indication matrix. FIG. 3a to FIG. 3c are schematic diagrams of estimating co-frequency interference according to an embodiment of the present invention.

Co-frequency interference strength $\hat{I}_{ij}$ between any two cell links is firstly estimated.

As shown in FIG. 3a, in different cells, between direct links, between a direct link and an access link, between access links, and between backhaul links, the co-frequency interference caused by the backhaul downlink to the access link is equal to the average co-frequency interference strength caused by a base station in one cell to another cell.

For example, base stations corresponding to two neighboring cell links $cl_i$ and $cl_j$ are $BS_i$ and $BS_j$, and the cells where the cell links are located are $c_i$ and $c_j$; the average co-frequency interference strength $\hat{I}_{ij}$ caused by base station $BS_i$ to cell $c_j$ of cell link $cl_j$ may be estimated by using formula (3a):

$$\hat{I}_{ij} = \frac{1}{\pi R_j^2} \int_{-\theta/2}^{\theta/2} \int_{D_{ij}\cos\alpha-(R_j^2-D_{ij}^2\sin^2\alpha)^{\frac{1}{2}}}^{D_{ij}\cos\alpha+(R_j^2-D_{ij}^2\sin^2\alpha)^{\frac{1}{2}}} p_i(P_i,l) dl d\alpha. \tag{3a}$$

where $D_{ij}$ is the distance between two base stations; $\theta$ is an angle between the connection line from $BS_i$ to $BS_j$, and the tangent of the border of the coverage area from $BS_i$ to $c_j$; $R_j$ is the coverage radius of $BS_j$; and $p_i(P_i,l)$ is signal power of the point which is 1 meter away from $BS_i$, where the signal power may be calculated according to the transmit power $P_i$ of $BS_i$ and propagation attenuation parameters.

As shown in FIG. 3b, in a same macro cell, the estimated interference strength caused by the direct link to the backhaul downlink is equal to the interference strength caused by the macro base station to the relay station. The interference strength may be calculated according to formula (3b).

$$\hat{I}_{ij} = p_i(P_i,D_{ij}). \tag{3b}$$

As shown in FIG. 3c, in a same macro cell, the estimated interference strength caused by the backhaul uplink to the direct link is equal to the interference caused by the relay station to the macro station, as shown in FIG. 2c. The interference strength may be calculated according to formula (3c).

$$\hat{I}_{ij} = \frac{1}{\pi R_i^2} \int_0^{2\pi} \int_0^{R(\alpha)} p_i(P_i, l) dl d\alpha. \quad (3c)$$

where $R(\alpha)$ is the distance between the relay station and the border of the macro cell under the angle $\alpha$.

Generally, in the relay network, for the same base station, no interference is caused by the access link to the backhaul downlink, by the access link to the backhaul uplink, and by the direct link to the backhaul uplink.

For simplification of calculation, several typical reference points in cell $cl_j$ where $cl_j$ is located may be selected for measurement, and usually, the cell coverage area is irregular. Therefore, a discrete form of the following formula (3d) may be used to estimate $\hat{I}_{ij}$:

$$\hat{I}_{ij} = \frac{1}{A} \sum_{r_j=1}^{R_j} p_i(P_i, l_{r_j}) \times a_{r_j}. \quad (3d)$$

where $R_j$ indicates the number of reference points in cell $c_j$; A indicates the size of cell $c_j$; $p_i(P_i, l_{r_j})$ indicates signal power of reference point $r_j$ from base station $BS_i$ to cell $c_j$; and $a_{r_j}$ indicates the size of the area represented by reference point $r_j$.

$\hat{I}_{ij}$ only indicates average estimation of mutual interference generated when two cell links use a same spectrum, but does not indicate the actual mutual interference and instantaneous mutual interference of the two cell links.

In addition, because the propagation attenuation parameters, transmit power, and cell coverage area are different, $\hat{I}_{ij}$ and $\hat{I}_{ij}$ may be different. The co-frequency interference estimation between any two cell links may be calculated and prestored.

Secondly, the actual average load $\overline{L}_i$ of each cell link is calculated according to formula (1), and the actual average interference strength $\overline{I}_i$ is measured according to formula (2).

Then the average data throughput $\overline{T}_j$ of the cell link is estimated.

Assuming that cell link $cl_i$ and cell link $cl_j$ currently use different spectrums, if cell link $cl_i$ reuses the spectrum of cell link $cl_j$, co-frequency interference to cell link $cl_j$ is increased. According to the embodiment of the present invention, replacing or adding a spectrum may improve capacity or reduce interference. Therefore, the capacity/load and interference strength are used as metrics for assessing the impact of spectrum replacement or addition. According to the Shannon theorem, the current average throughput of cell link $cl_j$ is:

$$\overline{T}_j = \overline{L}_j \cdot BW_{tot} \cdot \log\left(1 + \frac{\overline{S}}{\overline{I}_j \times BW_{tot} + N_0}\right). \quad (4)$$

Finally, co-frequency configuration performance of two cell links is assessed.

Assuming that the capacity requirement of cell link $cl_j$ does not change, because co-frequency interference of cell link $cl_i$ is introduced, the load increases to the virtual load or estimated load $\overline{L}_j'$:

$$\overline{T}_j = \overline{L}_j' \cdot BW_{tot} \cdot \log\left(1 + \frac{\overline{S}}{\overline{I}_j \times BW_{tot} + \hat{I}_{ij} + N_0}\right). \quad (5)$$

According to formulas (4) and (5), and assuming that interference power is far greater than noise power, and that the signal-to-noise ratio is far greater than 1, $\overline{L}_j'$ may be estimated as:

$$\overline{L}_j' \cong \left(\frac{1}{\overline{L}_j} - \frac{1}{\overline{T}_j} \cdot BW_{tot} \cdot \log\left(\frac{\overline{I}_j \times BW_{tot} + \hat{I}_{ij}}{\overline{I}_j \times BW_{tot}}\right)\right)^{-1} \quad (6)$$

The estimated load $\overline{L}_j'$ indicates the load after the load change of cell link $cl_j$ when cell link $cl_i$ reuses the spectrum of cell link $cl_j$.

According to the estimated load and/or corresponding operator policy, whether cell link $cl_i$ is allowed to reuse the spectrum of cell link $cl_j$ may be judged. For example, an operator may set several preset thresholds for different cells according to operation policies such as the coverage area of the cell and service assurance priority: light load threshold $\lambda_l$ and heavy load threshold $\lambda_h$ of cell link $cl_j$. If $\overline{L}_j' < \lambda_l$, the element of column j in row i of the co-frequency indication matrix indicates low, that is, the load rises little, which indicates a high reusable level; if $\lambda_l < \overline{L}_j' < \lambda_h$, the element of column j in row i of the co-frequency indication matrix indicates medium, that is, the load rises moderately, which indicates a moderate reusable level; if $\overline{L}_j' > \lambda_h$, the element of column j in row i of the co-frequency indication matrix indicates high, that is, the load rises greatly, which indicates a low reusable level. The value of each element of the co-frequency indication matrix may be in different forms. The above provides a discrete indication method for comparing preset thresholds. Alternatively, the assessed value calculated in formula (6) may also be directly used, or an indication method combining the two methods may be used. In addition, other operator policies may be implemented; for example, if the priority of a cell is high, other operator policies may be implemented by moderately lowering the reusable level of the spectrum of the cell for other cells.

220. Determine whether the load-related KPI of the cell is greater than the preset threshold. If the KPI is greater than the preset threshold, perform step 225; otherwise, continue to perform step 210. For example, the threshold is usually decided by the operator policy. If the KPI is greater than the preset threshold, the cell is a congested cell.

225. Determine whether there is a new spectrum available for updating the spectrum configuration. If there is a new spectrum available for updating the spectrum configuration, perform step 250; otherwise, perform step 230.

230. Search the co-frequency indication matrix for a reusable spectrum simultaneously suitable for the three links.

For example, for the macro cell having a relay station, it is necessary to search for a reusable spectrum simultaneously suitable for the three links. The following is a process of searching for a reusable spectrum based on the co-frequency indication matrix.

Assuming that dynamic spectrum management is performed in K cell links $\{cl_k|k=1, \ldots, K\}$ in the network, the co-frequency indication matrix is a K×K matrix.

The network has N spectrums $\{B_n|n=1, \ldots, N\}$, and the cell link whose spectrum will be updated is $cl_i$. Particularly, the backhaul links of the relay network may include backhaul uplinks and downlinks.

Firstly, each spectrum may be assessed according to interference strength.

For example, the interference strength in each frequency band may be measured and calculated by using formula (2). Spectrums of other cell links than the current cell link, whose interference strength is lower than the interference strength of the current spectrum of the current cell link, may constitute a set $\tilde{B}_i$.

Secondly, the set $CL_i$ of cell links of reusable spectrums is searched.

For example, based on the co-frequency indication matrix, values of reusable levels of other cell links $cl_{j \neq i}$ for cell link $cl_i$ are traversed. Assuming that reusable levels of P cell links are higher than the preset threshold, and that their spectrums belong to set $\tilde{B}_i$, cell links may be sorted in descending order according to the reusable levels: $CL_i = \{cl_{i,p} | p=1, \ldots, P\}$. The preset threshold is decided by the related operation policies, and indicates the allowed maximum value of the cell link load increase part, where the load increase part is caused by co-frequency interference increase because the spectrum is reused by other cell links. In out-of-band relay mode, a criterion for selecting a reusable spectrum may be added; for example, the spectrum is reused only when the reusable levels of the spectrum of a cell link for the three links are all higher than a level.

Then, the impact caused by spectrum updating to the cell link having the same frequency as $cl_{i,p}$ is assessed.

For example, assuming that the set of cell links having the same frequency as the cell link of $CL_i$ is $CL_{i,p}$, reusable levels of spectrums of all cell links in $CL_{i,p}$ for $cl_i$ are traversed. If all reusable levels are higher than the preset threshold, it indicates that the spectrum of cell $CL_{i,p}$ may be reused by $CL_i$, and searching is ended; otherwise, p=p+1, and the impact caused by spectrum replacement to the cell link having the same frequency as $CL_{i,p}$ is assessed repetitively until p=P+1.

Finally, when p≤P, it indicates that a reusable spectrum is found successfully, and the searching is ended; otherwise, it indicates that no reusable spectrum is found and the searching is ended.

235. Determine whether a reusable spectrum simultaneously suitable for the three links is found. If a reusable spectrum simultaneously suitable for the three links is found, perform step 250; otherwise, perform step 240.

For example, because resource scheduling of the in-band relay is controlled by the macro cell, use of spectrum resources of the macro cell and load distribution are matched. At this time, the in-band relay keeps the original operation mode unchanged.

240. Search the co-frequency indication matrix for a reusable spectrum respectively suitable for the three links.

For example, in the relay network, because a macro cell link and a micro cell link have different interference features on neighboring links, it is possible that no reusable spectrum simultaneously suitable for the three links is found. If no reusable spectrum simultaneously suitable for the three links is found, the three links are searched one by one for a reusable spectrum. The specific search process is similar to the search process in step 230, and is not further described herein.

245. Determine whether a spectrum respectively suitable for the three links is found. If a spectrum respectively suitable for three links is found, perform step 250; otherwise, perform step 265. The relay station will be switched from the in-band relay mode to the out-of-band relay mode, and the corresponding configuration updating is required.

250. Determine whether the interference-related KPI of the cell link is greater than the preset threshold. If the KPI is greater than the preset threshold, perform step 255; otherwise, perform step 260. For example, before spectrum adjustment, whether to replace or add a spectrum is determined according to the KPI. There are two causes of load increase: traffic increase, and decrease of spectrum efficiency caused by increase of interference strength. The interference strength at the cell link level is an important KPI of the network, and may also be mapped to spectrum efficiency. Step 250 may be performed at any time before, and may record the determined result so as to select to replace or add a spectrum when the spectrum configuration is updated.

255. Replace the original spectrum of the cell link.

For example, if the value of the interference strength of the cell link exceeds the preset threshold, or if the spectrum efficiency of the cell link is lower than the preset threshold, it indicates that interference strength to the original spectrum is great in the network. In this case, it is appropriate to replace the original spectrum.

260. Add a spectrum for the cell link.

For example, if the measured interference strength of the cell link does not exceed the preset threshold, or if the spectrum efficiency of the cell link is not lower than the preset threshold, it indicates that the original spectrum is fully used but still cannot satisfy the traffic. In this case, it is appropriate to add a spectrum.

When there is a new available spectrum or a spectrum is found, the new spectrum or the found spectrum is used for spectrum replacement or spectrum addition, and step 210 continues to be performed.

265. If no reusable spectrum is found, the corresponding spectrum updating operation cannot be performed. In this case, the value of an interrupt counter is increased by 1. The count value of the interrupt counter records the number of interrupt events that the dynamic spectrum management function is triggered but cannot be completed.

270. Determine whether the count of interrupt events exceeds the preset threshold. If so, perform step 275; otherwise, perform step 210.

275. If the count of interrupt events exceeds the preset threshold, replan spectrums of all cells, and perform step 210.

After updating of the spectrum configuration of the congested cell is completed, the network reenters the monitoring phase: maintaining or updating the co-frequency indication matrix, and measuring and collecting statistics of network parameters and calculating the KPI.

Figure 4:
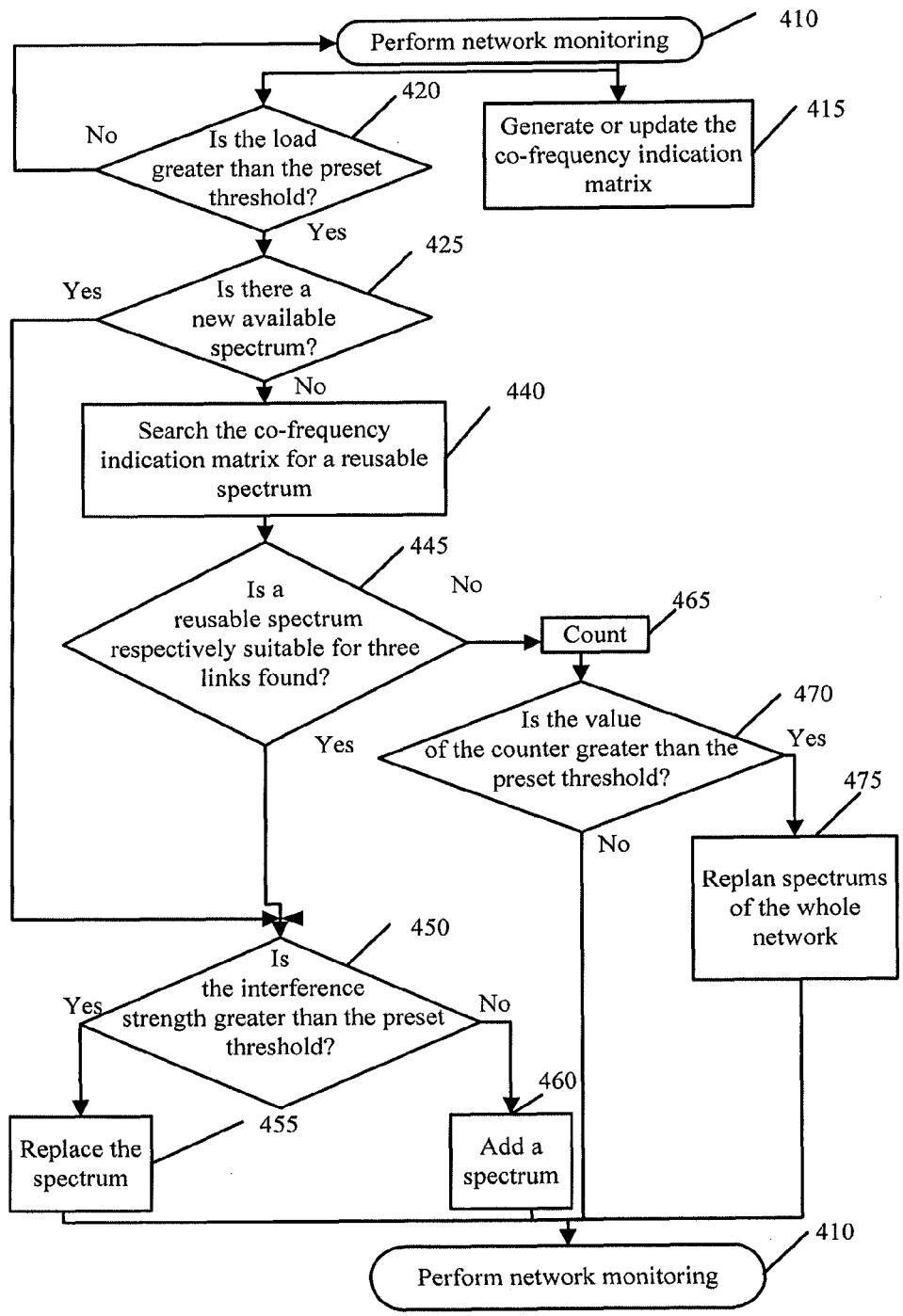
FIG. 4 is a flowchart of an example of a process of dynamic spectrum management according to another embodiment of the present invention.

FIG. 4 is a flowchart of an example of a process of dynamic spectrum management according to another embodiment of the present invention. The process of dynamic spectrum management in FIG. 4 is applicable to the out-of-band relay mode.

Steps 410 to 420 and steps 440 to 475 in FIG. 4 are the same as steps 210 to 220 and steps 240 to 475 respectively. The difference between the process in FIG. 4 and the process in FIG. 3 lies in that steps 230 and 235 do not need to be performed in the process in FIG. 4, and that after step 425 is performed in the process in FIG. 4, whether there is a new spectrum available for updating the spectrum configuration may be determined. If there is a new spectrum available for updating the spectrum configuration, step 450 is performed; otherwise, step 440 is performed.

Different from the processing of the in-band relay, the load measurement and spectrum management of the micro cell of the out-of-band relay are relatively independent of those of the macro cell. Therefore, during dynamic spectrum management, the macro cell and micro cell are not distinguished. The difference between the two cells is reflected in the calculation of the co-frequency indication matrix, that is, the difference in the coverage area and capabilities of causing co-frequency interference to the neighboring cells. According to the embodiment of the present invention, alternatively, the process of dynamic spectrum management of the relay network using the out-of-band relay mode is also applicable to dynamic spectrum management of other types of micro cells (such as a Pico-cell).

In the spectrum configuration processes of FIG. 2 and FIG. 4, according to cell load distribution and interference strength to neighboring cells, the spectrum configuration is adjusted adaptively, including spectrum replacement and spectrum addition. With the network operation and spectrum adjustment, some cell links may have multiple spectrums. On the premise of ensuring quality of service of the cell link (for example, not causing the load to rise obviously), releasing part of the spectrums is helpful for reducing co-frequency interference to links of the neighboring cells.

Figure 5:
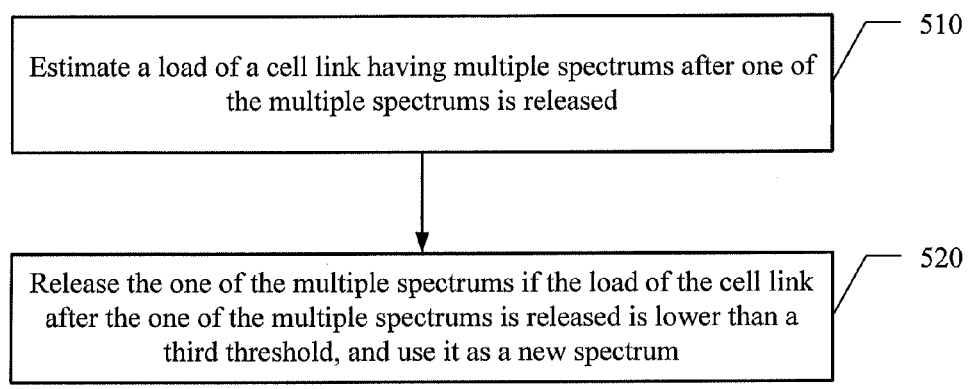
FIG. 5 is a schematic flowchart of a method for dynamic spectrum management according to another embodiment of the present invention.

FIG. 5 is a schematic flowchart of a method for dynamic spectrum management according to another embodiment of the present invention.

510. Estimate a load of a cell link having multiple spectrums after one of the multiple spectrums is released.

520. Release the one of the multiple spectrums if the load of the cell link after the one of the multiple spectrums is released is lower than a third threshold.

According to the embodiment of the present invention, whether to release the spectrum is determined by estimating the impact caused to the load by releasing part of spectrums, thereby reducing co-frequency interference to links of neighboring cells. In addition, the spectrum released by the cell link may be used by other cell links of heavy load, and no interference is caused between two cell links.

According to another embodiment of the present invention, the method in FIG. 5 further includes: determining whether the load of the cell link is lower than a fourth threshold, wherein in step 510, if the load of the cell link is lower than the fourth threshold, the load of the cell link after the one of the multiple spectrums is released is estimated.

According to the embodiment of the present invention, in step 520, if the multiple spectrums have different bandwidth and the load of the cell link after a spectrum of the lowest bandwidth is released is lower than the third threshold, the spectrum of the lowest bandwidth is released; or if the multiple spectrums have a same bandwidth and the load of the cell link after a spectrum of the lowest load is released is lower than the third threshold, the spectrum of the lowest load is released.

It should be noted that the method in FIG. 5 may be executed by a functional entity for centralized spectrum management in the network. The embodiment of the present invention is not limited in this regard; for example, the method in FIG. 5 may be executed by a functional entity for spectrum management and a base station in the network.

Figure 6:
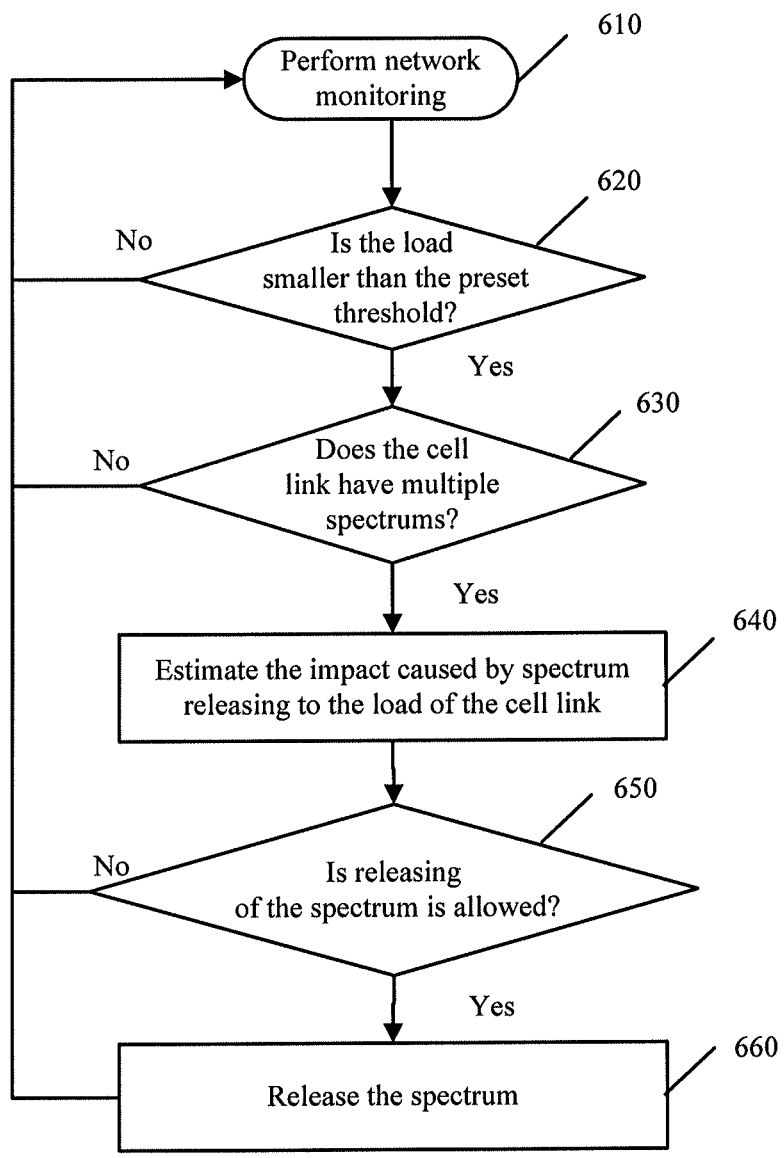
FIG. 6 is a flowchart of an example of a process of dynamic spectrum management according to another embodiment of the present invention.

FIG. 6 is a flowchart of an example of a process of dynamic spectrum management according to another embodiment of the present invention. The process in FIG. 6 is an example of dynamic spectrum management by releasing a spectrum.

610. Perform network monitoring to obtain KPI parameters. The process of network monitoring is similar to step 210 in FIG. 2, and is not further described herein.

620. Determine whether the KPI related to the load of a cell link is smaller than a preset threshold; if the KPI is smaller than the preset threshold, trigger a spectrum releasing process according to the KPI, and perform step 630; otherwise, continue to perform network monitoring.

630. Determine whether the cell link has multiple spectrums. If the cell link has multiple spectrums, perform step 640; otherwise, continue to perform network monitoring.

640. Assess the impact caused by spectrum releasing to the load of the cell link.

Assuming that cell link $cl_i$ has $N_i$ spectrums $\{B_n | n=1, \ldots, N_i\}$, the average load $\bar{L}_i$ of cell link $cl_i$ may be calculated according to formula (1).

If $N_i$ spectrums have different bandwidth, $N_i$ spectrums are sorted in ascending order according to bandwidth: $\{B_n' | n=1, \ldots, N_i\}$. Releasing spectrums causes the load of the cell link to rise. To ensure a smooth load, the spectrum of a low bandwidth is first considered to be released. For example, the estimated load of cell link $cl_i$ after $B_1'$ is released is:

$$\bar{L}'' = \bar{L} \times \frac{\sum_{i=1}^{n} B_i'}{\sum_{i=2}^{n} B_i'} \qquad (7)$$

If bandwidth of all $N_i$ spectrums is the same, $N_i$ spectrums are sorted in ascending order according to the current load of each spectrum: $\{B_i'' | i=1, \ldots, n\}$.

To reduce the impact caused by spectrum releasing to the service, the spectrum of a low load is first considered to be released. The estimated load of cell link $cl_i$ after $B_1''$ is released is:

$$\bar{L}'' = \bar{L} \times \frac{n}{n-1} \qquad (8)$$

650. Determine whether releasing of the spectrum is allowed, and if releasing of the spectrum is allowed, perform step 660; otherwise, continue to perform step 610.

Load $\bar{L}''$ after one spectrum is released is estimated according to formula (7) or (8); if $\bar{L}''$ is lower than the preset threshold, it indicates that spectrum releasing does not cause the load to rise obviously; otherwise, it indicates that spectrum releasing causes a serious impact to the load.

660. Release the spectrum. When releasing of a spectrum is allowed, the process enters a release preparation phase. In this phase, a new user is not scheduled to the spectrum, and when all users in the spectrum end transmission, the spectrum is cleared and released.

After releasing of the spectrum is completed, the network reenters the monitoring phase: maintaining and updating the co-frequency indication matrix, and measuring and collecting statistics of network parameters and calculating the KPI.

The above describes the method for dynamic spectrum management according to the embodiment of the present invention. The following describes an apparatus for dynamic spectrum management according to an embodiment of the present invention with reference to FIGS. 7-9.

Figure 7:
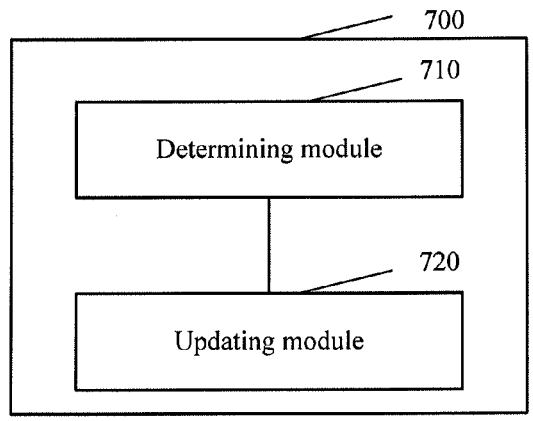
FIG. 7 is a schematic structural diagram of an apparatus for dynamic spectrum management according to an embodiment of the present invention.

FIG. 7 is a schematic structural diagram of an apparatus for dynamic spectrum management according to an embodiment of the present invention. An apparatus 700 in FIG. 7 includes: a determining module 710 and an updating module 720. An example in FIG. 7 is a functional entity for centralized spectrum management on an Operation, Administration and Maintenance (OAM) device or an MME.

The determining module 710 determines a reusable spectrum for one of multiple cell links in a network according to co-frequency indication information, where the co-frequency indication information is used to indicate reusable levels of spectrums of other cell links for each cell link in the multiple cell links. The updating module 720 updates a spectrum configuration of the one of the multiple cell links by using the reusable spectrum of the one of the multiple cell links.

By determining a reusable spectrum for a specific cell link according to co-frequency indication information, the embodiment of the present invention can locally adjust the spectrum configuration of the specific cell link, thereby reducing a spectrum configuration overhead while increasing network capacity and reducing inter-cell interference.

The operation and function of each unit of the apparatus 700 are not further described herein. For details, reference may be made to the method embodiment corresponding to FIG. 1.

Figure 8:
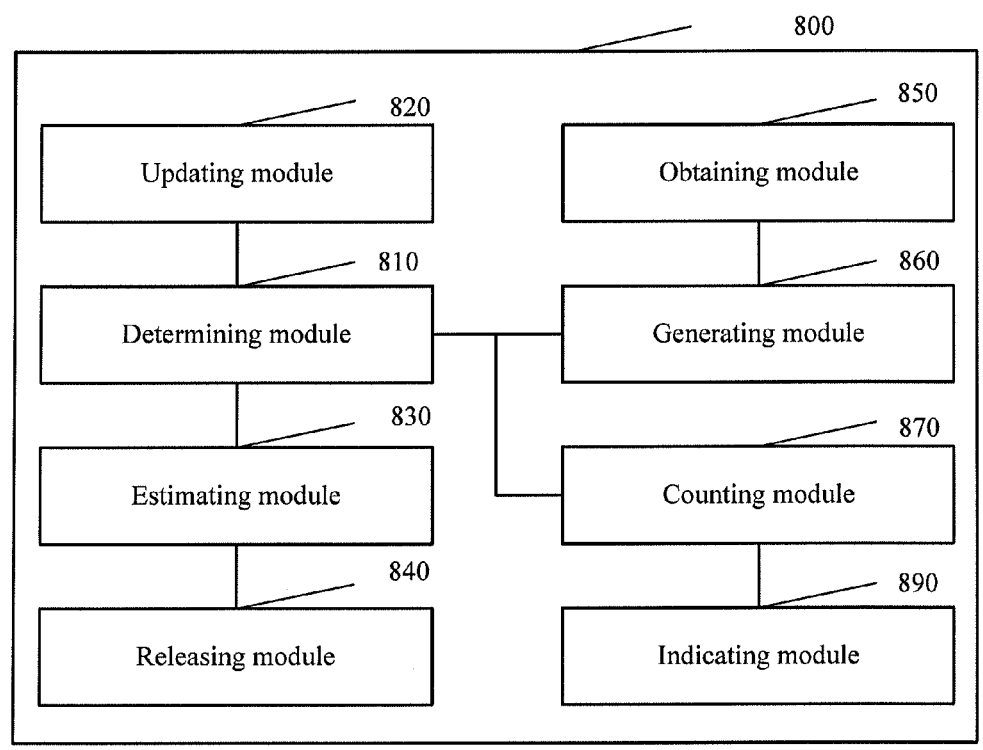
FIG. 8 is a schematic structural diagram of an apparatus for dynamic spectrum management according to another embodiment of the present invention.

FIG. 8 is a schematic structural diagram of an apparatus for dynamic spectrum management according to an embodiment of the present invention. An apparatus 800 in FIG. 8 includes: a determining module 810 and an updating module 820, which are similar to the determining module 710 and updating module 720 in FIG. 7, and are not further described herein. An example in FIG. 8 is a functional entity for centralized spectrum management on an OAM device or an MME.

According to another embodiment of the present invention, the determining module 810 further determines whether the load of the one of the multiple cell links exceeds a first threshold, where the determining module 810 determines the reusable spectrum for the one of the multiple cell links according to the co-frequency indication information if the load of the one of the multiple cell links exceeds the first threshold.

According to another embodiment of the present invention, the determining module 810 further determines whether interference strength of the one of the multiple cell links exceeds a second threshold, where the updating module 820 replaces a spectrum of the one of the multiple cell links by using the reusable spectrum of the one of the multiple cell links if the interference strength of the one of the multiple cell links exceeds the second threshold, and adds the reusable spectrum of the one of the multiple cell links for the one of the multiple cell links if the interference strength of the one of the multiple cell links does not exceed the second threshold.

According to another embodiment of the present invention, the determining module 810 further determines, before determining the reusable spectrum for the one of the multiple cell links according to the co-frequency indication information, whether a new spectrum is available to the one of the multiple cell links; and if a new spectrum is available to the one of the multiple cell links, the updating module 820 updates the spectrum configuration of the one of the multiple cell links by using the new spectrum, where the determining module 810 determines, if no new spectrum is available to the one of the multiple cell links, the reusable spectrum for the one of the multiple cell links according to the co-frequency indication information.

According to another embodiment of the present invention, the apparatus 800 further includes: an estimating module 830 and a releasing module 840. The estimating module 830 estimates, if the one of the multiple cell links has multiple spectrums, a load of the one of the multiple cell links after one of the multiple spectrums is released. The releasing module 840 releases the one of the multiple spectrums if the load of the one of the multiple cell links after the one of the multiple spectrums is released is lower than a third threshold.

According to another embodiment of the present invention, the determining module 810 further determines whether the load of the one of the multiple cell links is lower than a fourth threshold, where if the load of the one of the multiple cell links is lower than the fourth threshold, the releasing module 840 estimates the load of the one of the multiple cell links after the one of the multiple spectrums is released.

According to the embodiment of the present invention, the releasing module 840 releases the spectrum of the lowest bandwidth if the multiple spectrums have different bandwidth and the load of the one of the multiple cell links after the spectrum of the lowest bandwidth is released is lower than the third threshold; or releases the spectrum of the lowest load if the multiple spectrums have a same bandwidth and the load of the one of the multiple cell links after the spectrum of the lowest load is released is lower than the third threshold.

According to another embodiment of the present invention, the co-frequency indication information includes a co-frequency indication matrix, where the apparatus 800 further includes: an obtaining module 850 and a generating module 860. The obtaining module 850 obtains a link state of each cell link in the multiple cell links, propagation attenuation parameters, and a topology of the network. The generating module 860 generates or updates the co-frequency indication matrix according to the link state of each cell link in the multiple cell links, the propagation attenuation parameters, and the topology of the network, where each element of the co-frequency indication matrix indicates a reusable level of a spectrum of another cell link for one cell link in the multiple cell links.

According to the embodiment of the present invention, the link state includes: the load of the cell link, interference strength, and transmit power of a base station of the cell link; the reusable level of the spectrum of the other cell link for the one cell link in the multiple cell links includes: a level of a load change before and after the spectrum of the other cell link is reused by the one cell link, where the determining module 810 determines a spectrum of a cell link at the highest level of the load change before and after the spectrum is reused by the one of the multiple cell links, as the reusable spectrum for the one of the multiple cell links.

According to the embodiment of the present invention, the load after the spectrum of the spectrum of the other cell link is reused by the one cell link is indicated by the following formula:

$$L'_j \cong \left( \frac{1}{L_j} - \frac{1}{T_j} \cdot BW_{tot} \cdot \log\left( \frac{\bar{I}_j \times BW_{tot} + \bar{I}_{ij}}{\bar{I}_j \times BW_{tot}} \right) \right)^{-1}.$$

where the one cell link is cell link i, the other cell link is cell link j, $\overline{L}_j$ indicates the load before the spectrum of cell link j is reused by cell link i, $BW_{tot}$ is a total bandwidth owned by cell link j, $\overline{I}_j$ is interference strength of the spectrum of cell link j, $\hat{I}_{ij}$ indicates strength of co-frequency interference caused by cell link i to cell link j if cell link i reuses the spectrum of cell link j, $\hat{I}_{ij}$ is obtained according to transmit power of a base station of cell link i and propagation attenuation parameters, and $\overline{T}_j$ indicates average throughput of cell link j.

According to the embodiment of the present invention, the one of the multiple cell links includes one of a direct link, a backhaul link, and an access link having a same spectrum in one of the multiple cells, where the determining module 810 searches the co-frequency indication matrix for a reusable spectrum simultaneously suitable for the direct link, the backhaul link, and the access link according to the reusable levels of the spectrums of the other cell links in the multiple cell links for the one of the direct link, the backhaul link, and the access link; and if no reusable spectrum simultaneously suitable for the direct link, the backhaul link, and the access link is found, searches the co-frequency indication matrix for a reusable spectrum respectively suitable for the direct link, the backhaul link, and the access link according to the reusable levels of the spectrums of the other cell links in the multiple cell links for the one of the direct link, the backhaul link, and the access link.

According to the embodiment of the present invention, the one of the multiple cell links includes one of the direct link, the backhaul link, and the access link having different spectrums in one of the multiple cells, where the determining module 810 searches the co-frequency indication matrix for a reusable spectrum respectively suitable for the direct link, the backhaul link, and the access link according to the reusable levels of the spectrums of the other cell links in the multiple cell links for the direct link, the backhaul link, and the access link, and uses it as the reusable spectrum for the direct link, the backhaul link, and the access link.

According to the embodiment of the present invention, the determining module 810 searches the co-frequency indication matrix for a reusable spectrum for the one of the multiple cell links according to the reusable levels of the spectrums of the other cell links in the network for the one of the multiple cell links.

According to another embodiment of the present invention, the apparatus 800 further includes a counting module 870 and an indicating module 880. The counting module 870 counts the number of times of failing to find a reusable spectrum for at least one of the multiple cell links. The indicating module 880 indicates replanning of spectrums of the network when the number of times exceeds a fifth threshold.

By determining a reusable spectrum for a specific cell link according to co-frequency indication information, the embodiment of the present invention can locally adjust the spectrum configuration of the specific cell link, thereby reducing a spectrum configuration overhead while increasing network capacity and reducing inter-cell interference.

The operation and function of each unit of the apparatus 800 are not further described herein. For details, reference may be made to the method embodiment corresponding to FIG. 1.

Figure 9:
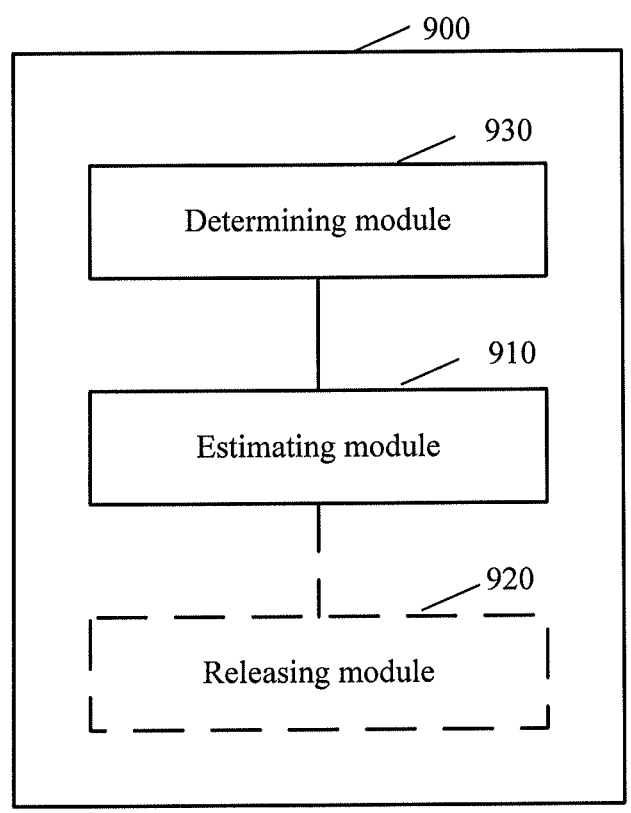
FIG. 9 is a schematic structural diagram of an apparatus for dynamic spectrum management according to another embodiment of the present invention.

FIG. 9 is a schematic structural diagram of an apparatus for dynamic spectrum management according to another embodiment of the present invention. An apparatus 900 in FIG. 9 includes: an estimating module 910 and a releasing module 920. An example in FIG. 9 is a functional entity for centralized spectrum management on an OAM or an MME.

The estimating module 910 estimates a load of a cell link having multiple spectrums after one of the multiple spectrums is released. The releasing module 920 releases the one of the multiple spectrums if the load of the cell link after the one of the multiple spectrums is released is lower than a third threshold.

According to the embodiment of the present invention, whether to release the spectrum is determined by estimating the impact caused to the load by releasing part of spectrums, thereby reducing co-frequency interference to links of neighboring cells. In addition, the released spectrum may be used by other cell links of heavy load.

According to another embodiment of the present invention, the apparatus 900 further includes a determining module 930. The determining module 930 determines whether the load of the cell link is lower than a fourth threshold, where the estimating module 910 estimates, if the load of the cell link is lower than the fourth threshold, the load of the cell link after one of the multiple spectrums is released.

According to the embodiment of the present invention, the releasing module 920 releases the spectrum of the lowest bandwidth if the multiple spectrums have different bandwidth and the load of the cell link after the spectrum of the lowest bandwidth is released is lower than the third threshold; or if the multiple spectrums have a same bandwidth and the load of the cell link after the spectrum of the lowest load is released is lower than the third threshold, releases the spectrum of the lowest load.

The operation and function of each unit of the apparatus 900 are not further described herein. For details, reference may be made to the method embodiment corresponding to FIG. 5.

According to the embodiment of the present invention, in units of cell links, the process of dynamic spectrum management is triggered according to the KPIs related to the load and spectrum efficiency, so that allocation of spectrum resources and load distribution are matched, which improves utilization of spectrums and improves load performance of the cell.

The embodiment of the present invention ensures that the impact on other cell links is controlled within the allowed range while reallocating spectrums of a single cell link to improve load performance.

The embodiment of the present invention reduces interference to other cell links while ensuring load strength of the current cell link by enabling the cell link of a light load to release part of spectrums.

With the method for calculating the co-frequency indication matrix in the embodiment of the present invention, dynamic spectrum management is capable of assessing the impact caused by spectrum reuse to other cell links, that is, interference increase and capacity decrease (load increase) caused by reuse of the spectrums of other cell links by the current cell link, and at the same time, the priority policy of different cells of the operator may also be conveniently applied.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, or a network device) to perform all or part of the steps of the method described in the embodiment of the present invention. The foregoing storage medium includes: any medium that can store program code, such as a USB flash disk, a removable hard disk, a read-only memory (Read-Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for dynamic spectrum management of an apparatus which comprises at least a processor executing program codes stored in a memory, which configure the apparatus to perform functions, comprising:
   determining, by a processor a reusable spectrum for one of multiple cell links in a network according to co-frequency indication information, wherein the co-frequency indication information comprises a co-frequency indication matrix, and wherein the co-frequency indication information is used to indicate reusable levels of spectrums of other cell links for each cell link in the multiple cell links;
   updating, by the processor, a spectrum configuration of the one of the multiple cell links by using the reusable spectrum of the one of the multiple cell links;
   obtaining, by the processor, a link state of each cell link in the multiple cell links, propagation attenuation parameters, and a topology of the network; and
   generating or updating, by the processor, the co-frequency indication matrix according to the link state of each cell link in the multiple cell links, the propagation attenuation parameters, and the topology of the network; wherein:
   each element of the co-frequency indication matrix indicates a reusable level of a spectrum of another cell link for one cell link in the multiple cell links;
   wherein: the link state comprises: a load of the cell link, interference strength, and transmit power of a base station of the cell link;
   the reusable level of the spectrum of the other cell link for the one cell link in the multiple cell links comprises:
      a level of a load change before and after the spectrum of the other cell link is reused by the one cell link; and
   wherein the determining of the reusable spectrum for the one of the multiple cell links in the network according to the co-frequency indication information comprises:
      determining, by the processor, a spectrum of a cell link at a highest level of a load change before and after the spectrum is reused by the one of the multiple cell links, as the reusable spectrum for the one of the multiple cell links;
   wherein: the load after the spectrum of the spectrum of the other cell link is reused by the one cell link is indicated by the following formula:

$$L'_j \cong \left( \frac{1}{L_j} - \frac{1}{T_j} \cdot BW_{tot} \cdot \log\left( \frac{\bar{I}_j \times BW_{tot} + \hat{I}_{ij}}{\bar{I}_j \times BW_{tot}} \right) \right)^{-1}$$

where the one cell link is cell link i, the other cell link is cell link j, $L_j$ indicates the load before the spectrum of cell link j is reused by cell link i, $BW_{tot}$ is a total bandwidth owned by cell link j, $\bar{I}_j$ is interference strength of the spectrum of cell link j, $\hat{I}_{ij}$ indicates strength of co-frequency interference caused by cell link i to cell link j if cell link i reuses the spectrum of cell link j, $\hat{I}_{ij}$ is obtained according to transmit power of a base station of cell link i and propagation attenuation parameters, and $T_j$ indicates average throughput of cell link j.

2. The method according to claim 1, further comprising:
   determining, by the processor, whether a load of the one of the multiple cell links exceeds a first threshold; wherein:
   the determining, by the processor, the reusable spectrum for the one of the multiple cell links in the network according to the co-frequency indication information comprises:
   determining, by the processor, the reusable spectrum for the one of the multiple cell links according to the co-frequency indication information if the load of the one of the multiple cell links exceeds the first threshold.

3. The method according to claim 1, further comprising: determining, by the processor, whether interference strength of the one of the multiple cell links exceeds a second threshold; wherein:
   the updating, by the processor, the spectrum configuration of the one of the multiple cell links by using the reusable spectrum of the one of the multiple cell links comprises:
      replacing, by the processor, a spectrum of the one of the multiple cell links by using the reusable spectrum of the one of the multiple cell links if the interference strength of the one of the multiple cell links exceeds the second threshold; and
      adding, by the processor, the reusable spectrum of the one of the multiple cell links for the one of the multiple cell links if the interference strength of the one of the multiple cell links does not exceed the second threshold.

4. The method according to claim 1, further comprising:
   before determining, by the processor, the reusable spectrum for the one of the multiple cell links according to the co-frequency indication information, determining, by the processor, whether a new spectrum is available to the one of the multiple cell links; and if a new spectrum is available to the one of the multiple cell links, updating, by the processor, the spectrum configuration of the one of the multiple cell links by using the new spectrum; wherein:
the determining, by the processor, the reusable spectrum for the one of multiple cell links in the network according to the co-frequency indication information comprises: if no new spectrum is available to the one of the multiple cell links, determining, by the processor, the reusable spectrum for the one of the multiple cell links according to the co-frequency indication information.

5. The method according to claim 1, further comprising:
if the one of the multiple cell links has multiple spectrums, estimating, by the processor, a load of the one of the multiple cell links after one of the multiple spectrums is released; and
releasing, by the processor, the one of the multiple spectrums if the load of the one of the multiple cell links after the one of the multiple spectrums is released is lower than a third threshold.

6. The method according to claim 5, further comprising: determining, by the processor, whether the load of the one of the multiple cell links is lower than a fourth threshold; wherein:
the estimating, by the processor, the load of the one of the multiple cell links after the one of the multiple spectrums is released comprises:
if the load of the one of the multiple cell links is lower than the fourth threshold, estimating, by the processor, the load of the one of the multiple cell links after the one of the multiple spectrums is released.

7. The method according to claim 5, wherein the releasing, by the processor, the one of the multiple spectrums if the load of the one of the multiple cell links after the one of the multiple spectrums is released is lower than the third threshold comprises:
if the multiple spectrums have different bandwidth and the load of the one of the multiple cell links after a spectrum of a lowest bandwidth is released is lower than the third threshold, releasing, by the processor, the spectrum of the lowest bandwidth; or
if the multiple spectrums have a same bandwidth and the load of the one of the multiple cell links after a spectrum of a lowest load is released is lower than the third threshold, releasing, by the processor, the spectrum of the lowest load.

8. The method according to claim 1, wherein: the one of the multiple cell links comprises one of a direct link, a backhaul link, and an access link having a same spectrum in one of the multiple cells;
the determining, by the processor, the reusable spectrum for the one of the multiple cell links in the network according to the co-frequency indication information comprises:
searching, by the processor, the co-frequency indication matrix for a reusable spectrum simultaneously suitable for the direct link, the backhaul link, and the access link according to the reusable levels of the spectrums of the other cell links in the multiple cell links for the one of the direct link, the backhaul link, and the access link; and
if no reusable spectrum simultaneously suitable for the direct link, the backhaul link, and the access link is found, searching, by the processor, the co-frequency indication matrix for a reusable spectrum respectively suitable for the direct link, the backhaul link, and the access link according to the reusable levels of the spectrums of the other cell links in the multiple cell links for the one of the direct link, the backhaul link, and the access link.

9. The method according to claim 1, wherein: the one of the multiple cell links comprises one of a direct link, a backhaul link, and an access link having different spectrums in one of the multiple cells;
the determining, by the processor, the reusable spectrum for the one of the multiple cell links in the network according to the co-frequency indication information comprises:
searching, by the processor, the co-frequency indication matrix for a reusable spectrum respectively suitable for the direct link, the backhaul link, and the access link according to the reusable levels of the spectrums of the other cell links in the multiple cell links for the direct link, the backhaul link, and the access link, and using it as the reusable spectrum for the direct link, the backhaul link, and the access link.

10. The method according to claim 1, wherein the determining, by the processor, the reusable spectrum for the one of the multiple cell links in the network according to the co-frequency indication information comprises:
searching, by the processor, the co-frequency indication matrix for a reusable spectrum for the one of the multiple cell links according to the reusable levels of the spectrums of the other cell links in the network for the one of the multiple cell links.

11. The method according to claim 10, further comprising:
counting, by the processor, the number of times of failing to find a reusable spectrum for at least one of the multiple cell links; and
determining, by the processor, whether the number of times exceeds a fifth threshold; and
indicating, by the processor, re-planning of spectrums of the network if the number of times exceeds the fifth threshold.

12. An apparatus for dynamic spectrum management, comprising at least a processor executing program codes stored in a memory, which configure the apparatus to:
determine a reusable spectrum for one of multiple cell links in a network according to co-frequency indication information, wherein the co-frequency indication information is used to indicate reusable levels of spectrums of other cell links for each cell link in the multiple cell links; and
update a spectrum configuration of the one of the multiple cell links by using the reusable spectrum of the one of the multiple cell links;
wherein the co-frequency indication information comprises a co-frequency indication matrix, and the apparatus is further configured to:
obtain a link state of each cell link in the multiple cell links, propagation attenuation parameters, and a topology of the network; and
generate or update the co-frequency indication matrix according to the link state of each cell link in the multiple cell links, the propagation attenuation parameters, and the topology of the network; wherein:
each element of the co-frequency indication matrix indicates a reusable level of a spectrum of another cell link for one cell link in the multiple cell links;
wherein: the link state comprises: the load of the cell link, interference strength, and transmit power of a base station of the cell link;

the reusable level of the spectrum of the other cell link for
  the one cell link in the multiple cell links comprises:
  a level of a load change before and after the spectrum of
    the other cell link is reused by the one cell link; and
the apparatus is further configured to:
  determine a spectrum of a cell link at a highest level of a
    load change before and after the spectrum is reused by
    the one of the multiple cell links, as the reusable
    spectrum for the one of the multiple cell links;
wherein: the load after the spectrum of the spectrum of the
  other cell link is reused by the one cell link is indicated
  by the following formula:

$$L'_j \cong \left( \frac{1}{L_j} - \frac{1}{T_j} \cdot BW_{tot} \cdot \log\left( \frac{\bar{I}_j \times BW_{tot} + \hat{I}_{ij}}{\bar{I}_j \times BW_{tot}} \right) \right)^{-1}$$

where the one cell link is cell link i, the other cell link is cell link j, $L_j$ indicates the load before the spectrum of cell link j is reused by cell link i, $BW_{tot}$ is a total bandwidth owned by cell link j, $\bar{I}_j$ is interference strength of the spectrum of cell link j, $\hat{I}_{ij}$ indicates strength of co-frequency interference caused by cell link i to cell link j if cell link i reuses the spectrum of cell link j, $\hat{I}_{ij}$ is obtained according to transmit power of a base station of cell link i and propagation attenuation parameters, and $T_j$ indicates average throughput of cell link j.

13. The apparatus according to claim 12, wherein the apparatus is further configured to: determine whether a load of the one of the multiple cell links exceeds a first threshold; and
  determine the reusable spectrum for the one of the multiple cell links according to the co-frequency indication information, if the load of the one of the multiple cell links exceeds the first threshold.

14. The apparatus according to claim 12, wherein the apparatus is further configured to:
  determine whether interference strength of the one of the multiple cell links exceeds a second threshold; and
  replace a spectrum of the one of the multiple cell links by using the reusable spectrum of the one of the multiple cell links if the interference strength of the one of the multiple cell links exceeds the second threshold, and
  add the reusable spectrum of the one of the multiple cell links for the one of the multiple cell links if the interference strength of the one of the multiple cell links does not exceed the second threshold.

15. The apparatus according to claim 12, wherein the apparatus is further configured to:
  determine, before determining the reusable spectrum for the one of the multiple cell links according to the co-frequency indication information, whether a new spectrum is available to the one of the multiple cell links;
  if a new spectrum is available to the one of the multiple cell links, update the spectrum configuration of the one of the multiple cell links by using the new spectrum; and
  if no new spectrum is available to the one of the multiple cell links, determine the reusable spectrum for the one of the multiple cell links according to the co-frequency indication information.

16. The apparatus according to claim 12, the apparatus is further configured to:
  estimate, if the one of the multiple cell links has multiple spectrums, a load of the one of the multiple cell links after one of the multiple spectrums is released; and
  release the one of the multiple spectrums if the load of the one of the multiple cell links after the one of the multiple spectrums is released is lower than a third threshold.

17. The apparatus according to claim 16, wherein the apparatus is further configured to:
  if the multiple spectrums have different bandwidth and the load of the one of the multiple cell links after a spectrum of a lowest bandwidth is released is lower than the third threshold, release the spectrum of the lowest bandwidth; or
  if the multiple spectrums have a same bandwidth and the load of the one of the multiple cell links after a spectrum of a lowest load is released is lower than the third threshold, release the spectrum of the lowest load.

18. The apparatus according to claim 12, wherein: the link state comprises: the load of the cell link, interference strength, and transmit power of a base station of the cell link;
  the reusable level of the spectrum of the other cell link for the one cell link in the multiple cell links comprises:
  a level of a load change before and after the spectrum of the other cell link is reused by the one cell link; and
  the apparatus is further configured to determine a spectrum of a cell link at a highest level of a load change before and after the spectrum is reused by the one of the multiple cell links, as the reusable spectrum for the one of the multiple cell links.

19. The apparatus according to claim 12, wherein: the one of the multiple cell links comprises one of a direct link, a backhaul link, and an access link having a same spectrum in one of the multiple cells;
  the apparatus is further configured to search the co-frequency indication matrix for a reusable spectrum simultaneously suitable for the direct link, the backhaul link, and the access link according to the reusable levels of the spectrums of the other cell links in the multiple cell links for the one of the direct link, the backhaul link, and the access link; and
  if no reusable spectrum simultaneously suitable for the direct link, the backhaul link, and the access link is found, search the co-frequency indication matrix for a reusable spectrum respectively suitable for the direct link, the backhaul link, and the access link according to the reusable levels of the spectrums of the other cell links in the multiple cell links for the one of the direct link, the backhaul link, and the access link.

20. The apparatus according to claim 12, wherein: the one of the multiple cell links comprises one of a direct link, a backhaul link, and an access link having different spectrums in one of the multiple cells; and
  the apparatus is further configured to search the co-frequency indication matrix for a reusable spectrum respectively suitable for the direct link, the backhaul link, and the access link according to the reusable levels of the spectrums of the other cell links in the multiple cell links for the direct link, the backhaul link, and the access link, and using it as the reusable spectrum for the direct link, the backhaul link, and the access link.

21. The apparatus according to claim 12, wherein the apparatus is further configured to search the co-frequency indication matrix for a reusable spectrum for the one of the multiple cell links according to the reusable levels of the spectrums of the other cell links in the network for the one of the multiple cell links.

22. The apparatus according to claim 21, the apparatus is further configured to:
  count the number of times of failing to find a reusable spectrum for at least one of the multiple cell links; and determining whether the number of times exceeds a fifth threshold; and indicate re-planning of spectrums of the network when the number of times exceeds the fifth threshold.

23. A method for dynamic spectrum management of an apparatus which comprises at least a processor executing program codes stored in a memory, which configure the apparatus to perform functions, comprising:

determining, by an apparatus, a reusable spectrum for one of multiple cell links in a network according to co-frequency indication information, wherein the co-frequency indication information is used to indicate reusable levels of spectrums of other cell links for each cell link in the multiple cell links; and updating, by the processor, a spectrum configuration of the one of the multiple cell links by using the reusable spectrum of the one of the multiple cell links;

wherein the co-frequency indication information comprises a co-frequency indication matrix, and the method further comprises:

obtaining, by the processor, a link state of each cell link in the multiple cell links, propagation attenuation parameters, and a topology of the network; and generating or updating, by the processor, the co-frequency indication matrix according to the link state of each cell link in the multiple cell links, the propagation attenuation parameters, and the topology of the network; wherein:

each element of the co-frequency indication matrix indicates a reusable level of a spectrum of another cell link for one cell link in the multiple cell links;

wherein the determining, by the processor, the reusable spectrum for the one of the multiple cell links in the network according to the co-frequency indication information comprises:

searching, by the processor, the co-frequency indication matrix for a reusable spectrum for the one of the multiple cell links according to the reusable levels of the spectrums of the other cell links in the network for the one of the multiple cell links; further comprising:

counting, by the processor, the number of times of failing to find a reusable spectrum for at least one of the multiple cell links; and determining, by the processor, whether the number of times exceeds a fifth threshold; and indicating, by the processor, re-planning of spectrums of the network if the number of times exceeds the fifth threshold.

* * * * *